(12) United States Patent
Xu et al.

(10) Patent No.: US 10,198,695 B2
(45) Date of Patent: Feb. 5, 2019

(54) MANIFOLD-AWARE RANKING KERNEL FOR INFORMATION RETRIEVAL

(71) Applicant: SONY CORPORATION, Tokyo (JP)

(72) Inventors: Xun Xu, Palo Alto, CA (US); Akira Nakamura, San Jose, CA (US); Dian Gong, Los Angeles, CA (US); Su Wang, San Jose, CA (US)

(73) Assignee: Sony Corporation, Tokyo (JP)

( * ) Notice: Subject to any disclaimer, the term of this patent is extended or adjusted under 35 U.S.C. 154(b) by 992 days.

(21) Appl. No.: 14/213,220

(22) Filed: Mar. 14, 2014

(65) Prior Publication Data

US 2014/0279755 A1  Sep. 18, 2014

Related U.S. Application Data

(60) Provisional application No. 61/794,003, filed on Mar. 15, 2013.

(51) Int. Cl.
*G06F 15/18* (2006.01)
*G06N 99/00* (2010.01)

(52) U.S. Cl.
CPC .................. *G06N 99/005* (2013.01)

(58) Field of Classification Search
CPC ............................. G06N 99/005; G06N 5/04
USPC ..................................... 706/15, 45
See application file for complete search history.

(56) References Cited

U.S. PATENT DOCUMENTS

| 8,150,858 | B2 | 4/2012 | Perronnin et al. |
| 8,204,842 | B1 * | 6/2012 | Zhang ............... G06F 17/30253 |
| | | | 706/45 |
| 8,396,286 | B1 * | 3/2013 | Aradhye .................. G06K 9/66 |
| | | | 382/159 |
| 2003/0128877 | A1 * | 7/2003 | Nicponski .......... G06K 9/00221 |
| | | | 382/224 |
| 2007/0203940 | A1 | 8/2007 | Wang et al. |
| 2009/0204556 | A1 | 8/2009 | Weston et al. |
| 2010/0169158 | A1 | 7/2010 | Agarwal et al. |
| 2011/0047105 | A1 | 2/2011 | Sternickel et al. |
| 2011/0145175 | A1 | 6/2011 | Agarwal |

(Continued)

OTHER PUBLICATIONS

"Manifold-Ranking Based Image Retrieval", He et al, Proceeding Multimedia 04 Proceedings of the 12$^{th}$ annual ACM international conference on Multimedia, Oct. 10-16, 2004, pp. 9-16.*

(Continued)

*Primary Examiner* — David R Vincent
(74) *Attorney, Agent, or Firm* — Haverstock & Owens LLP

(57) ABSTRACT

A manifold-aware ranking kernel (MARK) for information retrieval is described herein. The MARK is implemented by using supervised and unsupervised learning. MARK is ranking-oriented such that the relative comparison formulation directly targets on the ranking problem, making the approach optimal for information retrieval. MARK is also manifold-aware such that the algorithm is able to exploit information from ample unlabeled data, which helps to improve generalization performance, particularly when there are limited number of labeled constraints. MARK is nonlinear: as a kernel-based approach, the algorithm is able to lead to a highly non-linear metric which is able to model complicated data distribution.

24 Claims, 2 Drawing Sheets

(56) References Cited

U.S. PATENT DOCUMENTS

2011/0270779 A1 11/2011 Showalter
2012/0124037 A1* 5/2012 Lee .................. G06N 99/005
707/723

OTHER PUBLICATIONS

"Low-Rank Kernel Learning with Bregman Matrix Divergences", Brian Kulis, Matyas A. Sustik, Inderjit S. Dhillon, The Journal of Machine Learning Research, vol. 10, Dec. 1, 2009, pp. 341-376.*
"Spectral feature selection for supervised and unsupervised learning", Zheng Zhao, Huan Liu, Proceeding ICML 07, Proceedings of the 24th International conference on Machine Learning, Jun. 20-24, 2007, pp. 1151-1158.*
"Clustering and Embedding Using Commute Times", Huaijun Qiu, Edwin R. Hancock, IEEE Transactions on Pattern Analysis and Machine Intelligence, vol. 29, Issue 11, Nov. 2007, Date of Publication Sep. 17, 2007, pp. 1873-1890.*
"A Bregman Divergence Optimization Framework for Rankng on Data Manifold and Its New Extensions", Bin Xu, Jiajun Bu, Chun Chen, Deng Cai, Proceedings of the Twenty-Sixth AAAI Conference on Artificial Intelligence, 2012, pp. 1190-1196.*
"Manifold-ranking based retrieval using k-regular nearest neighbor graph", Bin Wang, Feng Pan, Kai-Mo Hu, Jean-Claude Paul, Pattern Recognition, vol. 45, Issue 4, Apr. 2002, pp. 1569-1577.*
"Incorporating Manifold Ranking with Active Learning in Relevance Feedback for Image Retrieval", Jun Wu, Yidong Li, Yingpeng Sang, Hong Shen, Parallel and Distributed Computing, Applications and Technologies (PDCAT), 2012, 13th International Conference on, Dec. 14-16, 2012, pp. 739-744.*
"A Max-Flow-Based Similarity Measure for Spectral Clustering", Jiangzhong Cao, Pei Chen, Yun Zheng, Qingyun Dai, ETRI Journal, vol. 35, No. 2, Apr. 2003, pp. 311-320.*
"Support Vector Machine Active Learning for Image Retrieval", Simon Tong, Edward Chang, Proceeding Multimedia '01 Proceedings of the ninth ACM International Conference on Multimedia, Sep. 30-Oct. 5, 2001, pp. 107-118.*
"Distance Metric Learning for Large Margin Nearest Neighbor Classification", Kilian Q. Weinberger, John Blitzer, Lawrence K. Saul, Proceeding NIPS '05 Proceedings of the 18th International Conference on Neural Information Processing Systems, Dec. 5 -8, 2008, pp. 1473-1480.*
Bin Xu et al., "A Bregman Divergence Optimization Framework for Ranking on Data Manifold and Its New Extensions", Tw2enty-Sixth AAI Conference on Artificial Intelligence, , Association for the Advancement of Artificial Intelligence (www.aaai.org), 2012, pp. 1190-1196.
Ulrike Von Luxburg et al., "Getting lost in space: Large sample analysis of the commute distance", Max Planck Institute for Biological Cybernetics, Tubingen, Germany, Saarland University, Saarbrucken, Germany, pp. 1-9.

* cited by examiner

MANIFOLD-AWARE RANKING KERNEL FOR INFORMATION RETRIEVAL

CROSS-REFERENCE TO RELATED APPLICATION

This application claims the benefit of U.S. Provisional Patent Application Ser. No. 61/794,003, filed on Mar. 15, 2013, and titled "MANIFOLD-AWARE RANKING KERNEL FOR INFORMATION RETRIEVAL" which is hereby incorporated by reference in its entirety for all purposes.

FIELD OF THE INVENTION

The present invention relates to the field of data searching. More specifically, the present invention relates to data searching using information learned from training data.

BACKGROUND OF THE INVENTION

In any information retrieval system, one key component is how to measure the similarity of a query object and objects to retrieve. Although pre-defined metrics are widely used, metrics learned from data have received more and more attention because such metrics are able to adapt to specific properties of the data of interest, resulting in higher retrieval accuracy.

SUMMARY OF THE INVENTION

A manifold-aware ranking kernel (MARK) for information retrieval is described herein. The MARK is implemented by using supervised and unsupervised learning. MARK is ranking-oriented such that the relative comparison formulation directly targets on the ranking problem, making the approach optimal for information retrieval. MARK is also manifold-aware such that the algorithm is able to exploit information from ample unlabeled data, which helps to improve generalization performance, particularly when there are limited number of labeled constraints. MARK is nonlinear: as a kernel-based approach, the algorithm is able to lead to a highly non-linear metric which is able to model complicated data distribution.

In one aspect, a method of manifold-aware ranking kernel learning programmed in a memory of a device comprises performing combined supervised kernel learning and unsupervised manifold kernel learning and generating a non-linear kernel model. Bregman projection is utilized when performing the supervised kernel learning. Unlabeled data is utilized in the unsupervised manifold kernel learning. The result comprises a non-linear metric defined by a kernel model. The supervised kernel learning employs a relative comparison constraint. The device is selected from the group consisting of a personal computer, a laptop computer, a computer workstation, a server, a mainframe computer, a handheld computer, a personal digital assistant, a cellular/mobile telephone, a smart phone, a smart appliance, a gaming console, a digital camera, a digital camcorder, a camera phone, an portable music player, a tablet computer, a video player, a DVD writer/player, a high definition video writer/player, a television and a home entertainment system.

In another aspect, a method of information retrieval programmed in a memory of a device comprises receiving a search query input, performing a search based on the search query input and using a metric kernel learned by manifold-aware ranking kernel learning and presenting a search result of the search. Manifold-aware ranking kernel learning comprises performing combined supervised kernel learning and unsupervised manifold kernel learning and generating a non-linear kernel model. Bregman projection is utilized when performing the supervised kernel learning. Unlabeled data is utilized in the unsupervised manifold kernel learning. The result comprises a non-linear metric defined by a kernel model. The supervised kernel learning employs a relative comparison constraint. The search result comprises a set of entities from a database that are similar to the search query input. The device is selected from the group consisting of a personal computer, a laptop computer, a computer workstation, a server, a mainframe computer, a handheld computer, a personal digital assistant, a cellular/mobile telephone, a smart phone, a smart appliance, a gaming console, a digital camera, a digital camcorder, a camera phone, an portable music player, a tablet computer, a video player, a DVD writer/player, a high definition video writer/player, a television and a home entertainment system.

In another aspect, an apparatus comprises a non-transitory memory for storing an application, the application for: performing combined supervised kernel learning and unsupervised manifold kernel learning and generating a non-linear kernel model and a processing component coupled to the memory, the processing component configured for processing the application. Bregman projection is utilized when performing the supervised kernel learning. Unlabeled data is utilized in the unsupervised manifold kernel learning. The result comprises a non-linear metric defined by a kernel model. The supervised kernel learning employs a relative comparison constraint.

In another aspect, an apparatus comprises a non-transitory memory for storing an application, the application for: receiving a search query input, performing a search based on the search query input and using a metric kernel learned by manifold-aware ranking kernel learning and presenting a search result of the search and a processing component coupled to the memory, the processing component configured for processing the application. Manifold-aware ranking kernel learning comprises: performing combined supervised kernel learning and unsupervised manifold kernel learning and generating a non-linear kernel model. Bregman projection is utilized when performing the supervised kernel learning. Unlabeled data is utilized in the unsupervised manifold kernel learning. The result comprises a non-linear metric defined by a kernel model. The supervised kernel learning employs a relative comparison constraint. The search result comprises a set of entities from a database that are similar to the search query input.

DETAILED DESCRIPTION OF THE PREFERRED EMBODIMENT

Figure 1:
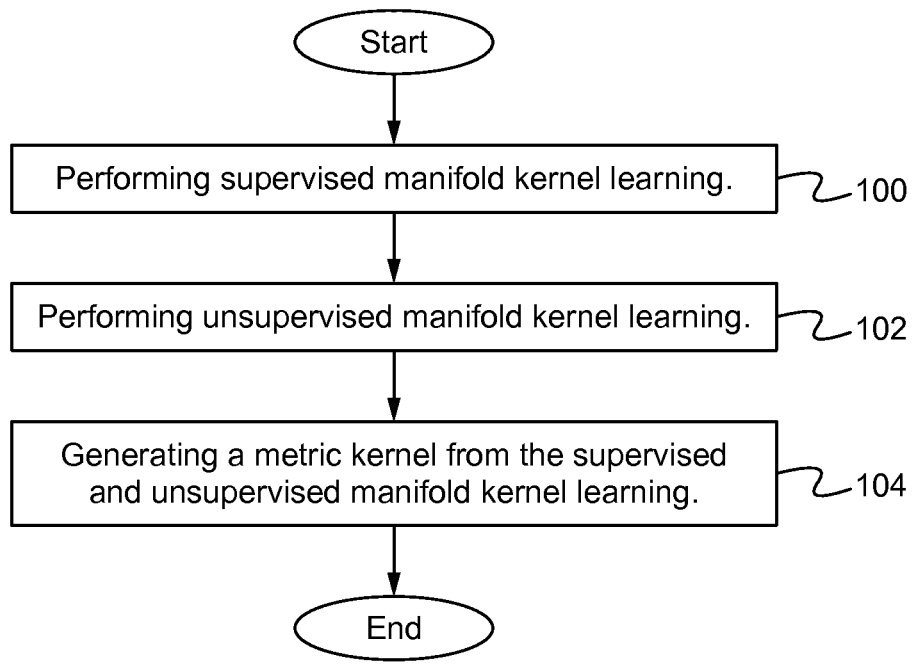
FIG. 1 illustrates a flowchart of a method of manifold-aware ranking kernel learning according to some embodiments.

A novel metric learning algorithm, e.g., manifold-aware ranking kernel (MARK), is described herein. MARK learns a positive semi-definite kernel matrix by simultaneously maximizing the relative comparison margins and exploring the intrinsic data manifold structure. An efficient optimization method, Bregman projection, is employed in learning MARK.

The relative comparison formulation of the algorithm directly targets on a ranking problem, making the approach optimal for information retrieval. The algorithm is able to exploit information from ample unlabeled data, which helps to improve generalization performance, especially when there are a limited number of labeled constraints. As a kernel-based approach, the algorithm is able to lead to a highly non-linear metric which is able to model complicated data distribution.

Although developed with content-based retrieval of images as the main application, the described algorithm is a general metric learning approach that is able to be employed in other information retrieval applications as well.

Data Formulation

Before going to the details of the learning framework, the description of the data formulation is given. It is assumed there are N data points $\{x_1, x_2, \ldots x_N\}$, where $x_i \in R^D$ ($1 \leq i \leq N$) is a D-dimensional vector representing a single data sample. Among these N data points, the first $N_1$ points $\{x_1, x_2, \ldots x_{N_1}\}$ are the training set, and the rest $\{x_{N_1}, x_2, \ldots x_N\}$ is the testing set.

Different from the standard supervised classification learning, the class/category label of the training data is not available in the training stage. Instead of class labels, C rank-list constraints $\{C_j\}_{j=1}^C$ are used, where $C_j = \{x_{j_0}; Z_j\}$ includes both a query $y_j$ and a list of relevant feedback $Z_j$. Here $y_j$ and $Z_j$ both belong to the training data set and $$Z_j = \{x_{j_1}, x_{j_2}, \ldots, x_{j_{L_j}}\}.$$

The list of feedback encodes the high order relative comparison information, e.g., for $1 \leq r < s \leq L_j$ ($L_j \geq 2$), the distance $d(x_{j_0}, x_{j_r})$ is smaller than $d(x_{j_0}, x_{j_s})$ (similarity function is able to be used here to replace the distance function).

For two different constraints, $C_j$ and $C_k$, their lengths are able to be different, e.g., there are variable lengthed rank-list constraints. In an extreme case, if all $L_j$ are equal to 2 (the minimum possible value), then the rank-list constraints degenerate to the triplet/relative distance constraint, which has been shown to be more flexible than pair-wise (dis)-similarity constraint in previous metric learning works. Thus, it is able to be seen that the rank-list constraint is the most general constraint encoding the distance information in the metric/kernel learning domain.

Most of the learning to rank works focus on learning a proper absolute score function for the query while the focus herein is on the relative comparison.

Loss Function

The linear Mahalanobis distance metric learning problem is first considered, and the following loss function is used:

$$\min_{A \geq 0, A_U \geq 0} f(A, A_U) + g(A_U, \{x_i\}) \quad (1)$$

$$\text{s.t.: } r(A, C_j) \leq 0, 1 \leq j \leq C$$

where $A \in R^{D \times D}$, $A_U \in R^{D \times D}$ are the final learned Mahalanobis distance matrix and the unsupervised distance matrix which must be positive semi-definite (P.S.D.). f is the regularizer which ties the unsupervised learning and rank-constraints based learning together. g is the data function for the unsupervised distance matrix learning from the data itself without any other information. r is the rank-list constraint function that ties A and available (rank-list) side information together. Given $A \in R^{D \times D}$, the distance $d^A(x_i, x_j)$ between $x_i$ and $x_j$ can be calculated as $\text{Tr}(A(x_i-x_j)(x_i-x_j)^T)$.

In the above formulation, A and $A_U$ are jointly optimized, which enjoys certain advantages but often leads to a difficult optimization problem. In particular, the regularizer and data cost function are quite different from each other in the usual case, and thus, the following two step approach is used:

$$\text{step1: } A_u^* = \min_{A_U \geq 0} g(A_U, \{x_i\}) \quad (3)$$

$$\text{step2: } \min_{A \geq 0} f(A, A_U^*), \text{ s.t.: } r(A, C_j) \leq 0, 1 \leq j \leq C$$

These two steps for (2) are able to be specifically designed (use domain knowledge) which also has an easier optimization problem than (1).

Despite the successes of the linear distance metric learning, it has been found that real data usually has a complicated and nonlinear structure which possibly is not able to be fully handled by the linear distance metric. Thus, the following nonlinear kernel framework is used, $$\text{step1: } K_U^* = \min_{K_U \geq 0} g(K_U, \{x_i\}) \quad (3)$$

$$\text{step2: } \min_{K \geq 0} f(K, K_U^*), \text{ s.t.: } r(K, C_j) \leq 0, 1 \leq j \leq C$$

where $K \in R^{N \times N}$, $K_U \in R^{N \times N}$ are the final learned kernel matrix and the unsupervised kernel matrix which is positive semi-definite (P.S.D.). Functions $f$, $g$ and $r$ have the same meaning as Equation (1) but are adapted into the kernel domain.

Since $K_U$ and K are learned separately in Equation (3), discussion is included of how to choose the unsupervised kernel learning function g, and how to choose regularizer f and rank-list constraint function r, as two paralleled directions. In particular, handling the rank-list information $C_j$ in r is important, considering that the learned kernel is applied to ranking and retrieval. For instance, one of the choices is to use the K-L divergence of permutation probability in r. Formally, given K, the distance $d^K$ is able to be calculated as $d^K(x_i, x_j) = \text{Tr}(K(e_i-e_j)(e_i-e_j)^T)$. Thus, the distance between all feedback and the query should be $\{\text{Tr}(K(e_{j_0}-e_{j_1})(e_{j_0}-e_{j_1})^T)\}_{l=1}^{L_j}$ (for constraint $C_j$). Then, function $r(K,C_j)$ is able to be represented as $r(\{d_{j_0 j_l}^K\}_{l=1}^{L_j}, \{j_l\}_{l=1}^{L_j})$, where the first term in the function is the short notation of all distances between $L_j$ feedback and the query, and the second term is the relative distance order information from $C_j (j_k < j_l$ for $k < l)$.

It has been shown that, for the exponential score function, the score value (distance is used as the input) is only depending on the relative distance information.

Based on the general formulation in Equation (3), a metric learning algorithm, Manifold-Aware Ranking Kernel (MARK), is able to be used. MARK employs the Bregman divergence (Log Det) regularizer. The supervised learning and the unsupervised manifold kernel learning are described herein, and the amplified commute kernel is chosen to be the unsupervised kernel.

Supervised Kernel Learning with Relative Comparison Constraint

It is able to be shown that the rank-list constraint is able to be decomposed into multiple (standard) relative comparison constraints, for certain rank-list constraint functions. Thus, instead of using the C rank-list constraints $\{C_j\}_{j=1}^C$, it is assumed there are C relative constraints, $\{[x_{j_0}; x_{j_1}, x_{j_2}]\}_{j=1}^C$, where $x_{j_0}$ is closer to $x_{j_0}$ than $x_{j_0}$ (or short noted as $j_1 \prec j_2$). By choosing the initial relative comparison margin and the Log Det divergence in the regularizer, the supervised learning part of framework Equation (3) is able to be presented as $$\min_{K \succ 0, \alpha} D_\phi(K, K_U) \quad (4)$$
$$\text{s.t. } d^K(x_{j_0}, x_{j_2}) - d^K(x_{j_0}, x_{j_1}) \geq \xi, 1 \leq j \leq C$$

where $d^K$ is the kernel distance function (given before) and $D_\varphi$ is the Bregman matrix divergence $D_\varphi(K_1, K_2) = \varphi(K_1) - \varphi(K_2) - tr(\nabla\varphi(K_2)^T(K_1 - K_2))$, which is specifically chosen as the Log Det function, e.g., $\varphi(K) = -\log \det(K)$ and $D_\varphi(K_1, K_2) = tr(K_1 K_2) - \log \det(K_1 K_2^{-1}) - N$.

The constraints in Equation (4) are able to be reformulated as linear constraints enforced on the kernel by using the definition of the kernel distance function. Thus, a convex optimization problem is obtained which has a convex objective function and linear constraints as, $$\min_{K \succ 0} D_\phi(K, K_U) \quad (5)$$
$$\text{s.t. } Tr(K(e_{j_0}, e_{j_2})(e_{j_0}, e_{j_2})^T - K(x_{j_0}, x_{j_1})(x_{j_0}, x_{j_1})^T) \geq \xi,$$
$$1 \leq j \leq C$$

where $e_j$ is a constant vector in which all elements are 0 except the Jth element is 1. $K_U$ is the unsupervised manifold kernel. $\xi$ is the relative comparison (safe) margin which is to be satisfied.

Equation (5) appears as a reasonable optimization framework, however, it still has potential problems for real applications. Firstly, there may not exist a feasible P.S.D kernel K as the solution of Equation (5). Secondly, in certain cases, online users provide the relative comparison constraint which may be incorrect. Lastly, for some examples, $X_{j_0}$, the discrminability between $x_{j_0}$ and others is not inherent. Thus, using the constraint involved $X_{j_0}$ (e.g., $\{[X_{j_0}; x_{j_1}, x_{j_2}]\}_{j=1}^C$) to satisfy the same margin $\xi$ as other constraints is not a reasonable choice.

By considering all three issues, slack variables and local margins are introduced to get a more practical optimization problem. To this end, $$\min_{K \succ 0} D_\phi(K, K_U) + \gamma D_\varphi(\vec{\xi}, \vec{\xi}_0) \quad (6)$$
$$\text{s.t. } Tr(K(e_{j_0}, e_{j_1})(e_{j_0}, e_{j_1})^T - K(e_{j_0}, e_{j_2})(e_{j_0}, e_{j_2})^T) \leq \vec{\xi}(j),$$
$$1 \leq j \leq C$$

where $\vec{\xi}_0$ is the original given length-C margin vectors and $\vec{\xi}$ is the one be joint-optimized in Equation (6). The margin is changed to be negative in framework Equation (6).

Given an unsupervised learnt kernel $K_U$, the supervised kernel K is able to be optimized from Equation (6) by using the Bregman projection. For each iteration, the Bregman optimization method will pick up a constraint and do the projection by solving the following equations, $$\begin{cases} \nabla_\phi(K_{t+1}) = \nabla_\phi(K_t) + \alpha_j A_j \\ \nabla_\phi(\vec{\xi}_{t+1}) = \nabla_\phi(\vec{\xi}_t) - \dfrac{\alpha_j}{\gamma} e_j \\ Tr(K_{t+1} A_j) = e_j^T \vec{\xi}_{t+1} \end{cases} \quad (7)$$

where $A_j \in R^{N \times N}$ is the short notation of constraint matrix $(e_{j_0} - e_{j_1})^T - (e_{j_0} - e_{j_1})^T - (e_{j_0} - e_{j_2})(e_{j_0} - e_{j_2})^T$, which is essentially a rank-2 matrix, and $K_t \in R^{N \times N}$ is the solution at the time-t iteration.

The Bregman matrix divergence and vector divergence are used for $\varphi$ and $\varphi$, thus, Equation (7) is able to be formulated as, $$\begin{cases} K_{t+1} = (K_t^{-1} - \alpha_j A_j)^{-1} \\ e_j^T \vec{\xi}_{t+1} = \dfrac{\gamma e_j^T \vec{\xi}_t}{\gamma + \alpha_j e_j^T \vec{\xi}_t} \\ Tr(K_{t+1} A_j) = e_j^T \vec{\xi}_{t+1} \end{cases} \quad (8)$$

where $\vec{\xi}_t$ is the length-C margin vector in the time-t iteration and $\alpha_j$ is the updating parameter to be solved.

The core-part of the Equation (8) is the matrix inverse process $K_{t+1} = (K_{t-1} - \alpha_j A_j)^{-1}$, which is essentially a rank-2 updating (compare with the rank-1 updating in ITML and low-rank kernel learning). Based on the matrix inverse Sherman-Morrison formula, there is, $$K_{t+1} = K_t - \dfrac{\alpha_j(1 + \alpha_j q_j)}{(1 - \alpha_j p_j)(1 + \alpha_j q_j) + \alpha_i^2 c_i^2} K_t z_j z_j^T K_t - \dfrac{\alpha_j(1 + \alpha_j p_j)}{(1 - \alpha_j p_j)(1 + \alpha_j q_j) + \alpha_i^2 c_i^2} K_t w_j w_j^T K_t - \dfrac{\alpha_j^2 c_i}{(1 - \alpha_j p_j)(1 + \alpha_j q_j) + \alpha_i^2 c_i^2} K_t(z_j w_j^T) K_t - \dfrac{\alpha_j^2 c_i}{(1 - \alpha_j p_j)(1 + \alpha_j q_j) + \alpha_i^2 c_i^2} K_t(w_j z_j^T) K_t \quad (9)$$

where $z_j$ and $w_j$ are the short-notations for $(e_{j_0} - e_{j_1})$ and $(e_{j_0} - e_{j_2})$. Also, $p_j$, $q_j$ and $c_j$ are the short-notations for $z_i^T K_t z_i$, $w_i^T K_t w_i$ and $w_i^T K_t z_i$.

By combining Equations (9) and (8), the Bregman updating parameter $\alpha_j$ is able to be solved by the following quadratic equation, $$\{(p_j q_j - c_j^2)(2 e_j^T \vec{\xi}_t + \gamma e_j^T \vec{\xi}_t)\} \alpha_j^2 + \quad (10)$$
$$\{(2 p_j q_j - 2 c_j^2)\gamma + (p_j - q_j) e_j^T \vec{\xi}_t + (p_j - q_j)\gamma e_j^T \vec{\xi}_t\} \alpha_j +$$
$$\{(p_j - q_j)\gamma - \gamma e_j^T \vec{\xi}_t\} = 0$$

Equation (10) is a standard quadratic equation for $\alpha_j$.

The in depth analysis of this Bregman projection is given herein, and it is assumed that Equation (10) always has two solutions, and the smaller one is used in the updating process. The complete updating process in one iteration is given as follows, $$\{[\alpha_j(1)\alpha_j(2)] \leftarrow \alpha(p_j, q_j, c_j, \gamma, e_j^T \vec{\xi}_t), \quad (11)$$

$$\alpha_j = \min([\alpha_j(1)\alpha_j(2)]$$

$$\{\beta_x, \beta_w, \beta_{zw}, \beta_{wz}\} \leftarrow \beta(\alpha_j, p_j, q_j, c_j, \gamma)$$

$$K_{t+1} \leftarrow K_t + \beta_z K_t z_j z_j^T K_t +$$

$$\beta_w K_t z_j z_j^T K_t + \beta_{zw} K_t z_j z_j^T K_t + \beta_{wz} K_t z_j z_j^T K_t$$

$$\lambda_j \leftarrow \lambda_j - \alpha_j$$

$$e_j^T \xi_{t+1} \leftarrow \frac{\gamma e_j^T \vec{\xi}_t}{\gamma + \alpha_j e_j^T \vec{\xi}_t}$$

The newly introduced variable $\lambda$, is the dual variable corresponding to constraint. $\lambda_i$ is required to be non-negative to satisfy the K.K.T condition for the optimization process. The same as the margin vector $\vec{\xi}_t$, a length-C dual variable vector $\vec{\lambda}_j$ at the time-t iteration is able to be used.

The updating process will be stopped if $\vec{\lambda}_j$ is converged.

Unsupervised Manifold Kernel Learning

Choosing a proper unsupervised manifold kernel $K_U$ is another important feature of the MARK algorithm. The amplified commute time kernel (ACK) is used in Equation (6).

The ACK kernel is induced from the amplified commute time distance, $$K_{ACK}(i, j) = \frac{\overline{K_{ACK}}(i, j)}{(K_{ACK}(i, i)K_{ACK}(j, j))^2} \quad (12)$$

$$\overline{K_{ACK}} = -\left(I - \frac{1}{N} 1_N 1_N^T\right) C_{ACD} \left(I - \frac{1}{N} 1_N 1_N^T\right)$$

where $C_{ACD}$ is the amplified commute time distance matrix and is able to be calculated as, $$C_{ACD}(i, j) = S_{ij} + u_{ij} \quad (13)$$

$$C_{ACD}(i, j) = 0$$

$$\begin{cases} S_{ij} = R_{ij} - \frac{1}{d_i} - \frac{1}{d_j} \\ u_{ij} = \frac{2w_{ij}}{d_i d_j} - \frac{w_{ii}}{d_i^2} - \frac{w_{jj}}{d_j^2} \end{cases}$$

where $R_{ij}$ is the resistance distance of the random walk between node i and node j on the data graph.

Resistance distance is tightly connected with the commute time distance, $$C_{ij} = \text{vol}(G) R_{ij} \quad (14)$$

where $C_{ij}$ is the commute time distance between node i and node j, and G is the indirect weighted graph, which is built from the data. In particular, the commute time distance is able to be calculated from the pseudo-inverse of the Laplacian matrix of graph G, $$C \equiv L^\dagger = (D-W)^\dagger \quad (15)$$

where L is the unnormalized graph Laplacian matrix for graph G, and W is the weight matrix of G.

FIG. 1 illustrates a flowchart of a method of manifold-aware ranking kernel learning according to some embodiments. In the step 100, supervised kernel learning is performed. In some embodiments, the Bregman optimization method is utilized in the supervised kernel learning. In the step 102, unsupervised manifold kernel learning is performed. In the step 104, a metric kernel is generated from the supervised and unsupervised manifold kernel learning. In some embodiments, fewer or additional steps are implemented. In some embodiments, the order of the steps is modified.

Figure 2:
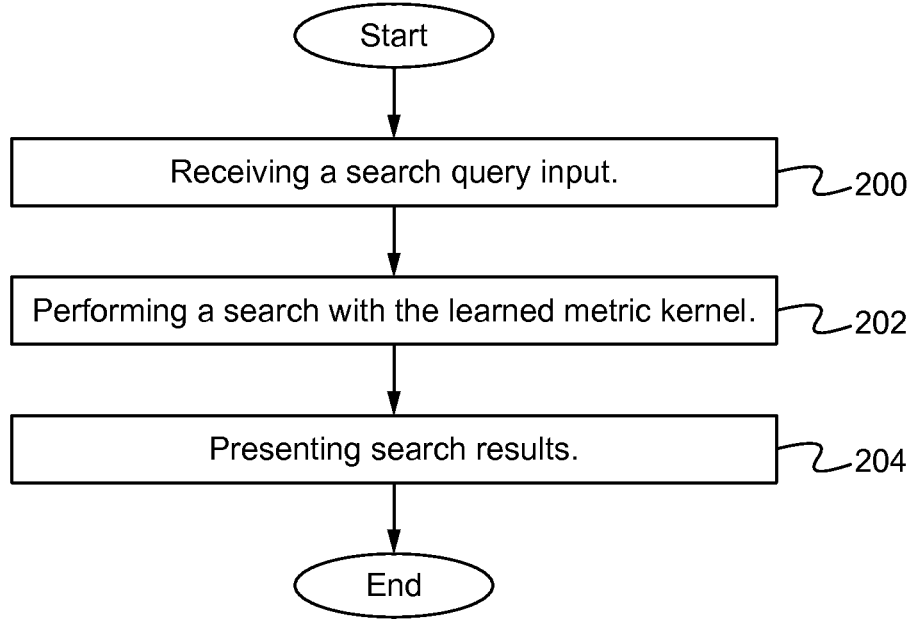
FIG. 2 illustrates a flowchart of a method of information retrieval according to some embodiments.

FIG. 2 illustrates a flowchart of a method of information retrieval according to some embodiments. In the step 200, a search query input is received. For example, a user provides an image or text to search for. In the step 202, a search is performed using the metric kernel learned by manifold-aware ranking kernel learning. In the step 204, results are presented. The results are able to be in any presentation format (e.g., a list of hyperlinks, a table of images, a single image). In some embodiments, fewer or additional steps are implemented. In some embodiments, the order of the steps is modified.

Figure 3:
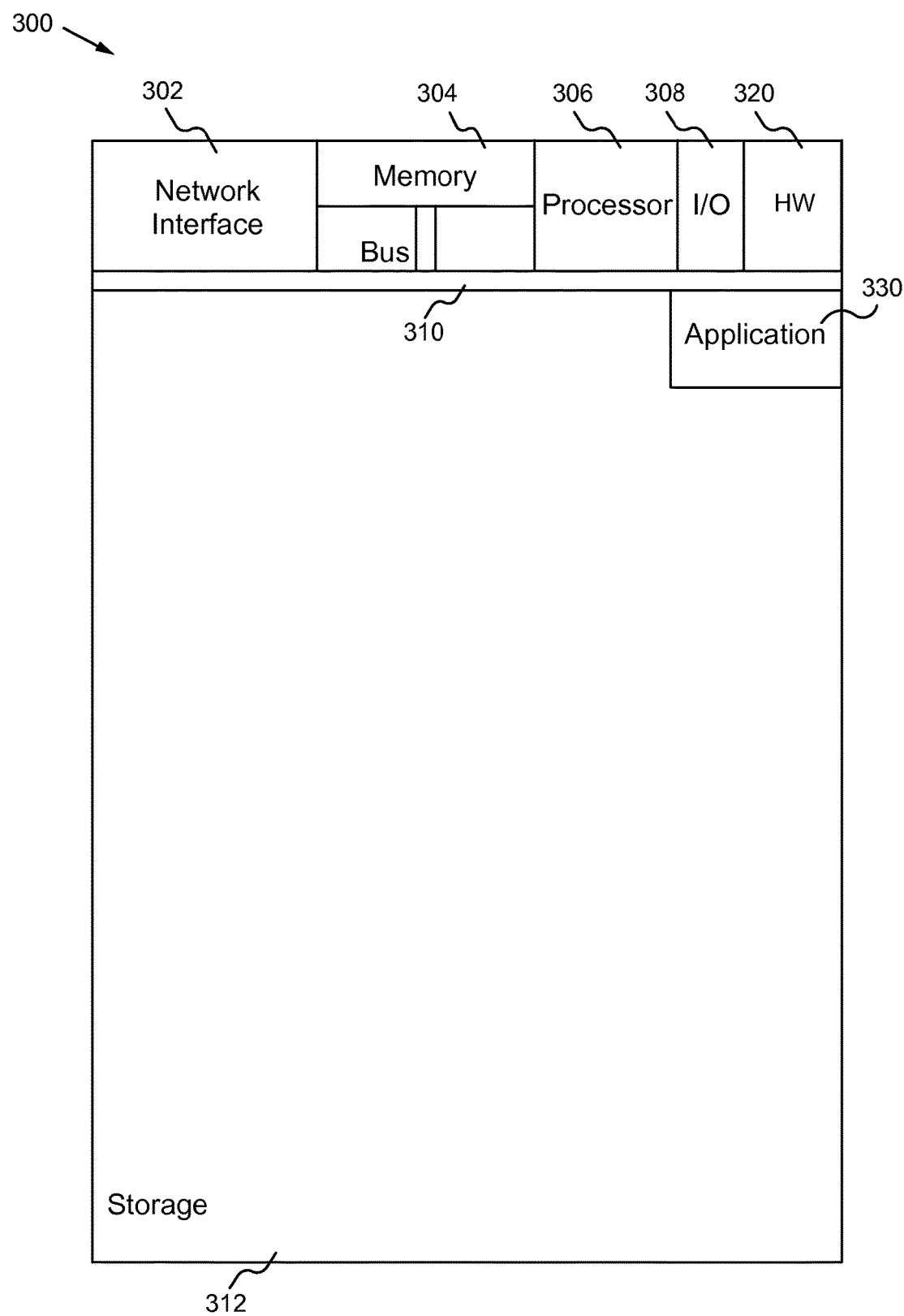
FIG. 3 illustrates a block diagram of an exemplary computing device configured to implement the information retrieval method according to some embodiments.

FIG. 3 illustrates a block diagram of an exemplary computing device configured to implement the manifold-aware ranking kernel for information retrieval method according to some embodiments. The computing device 300 is able to be used to acquire, store, compute, process, communicate and/or display information such as text, images and videos. In general, a hardware structure suitable for implementing the computing device 300 includes a network interface 302, a memory 304, a processor 306, I/O device(s) 308, a bus 310 and a storage device 312. The choice of processor is not critical as long as a suitable processor with sufficient speed is chosen. The memory 304 is able to be any conventional computer memory known in the art. The storage device 312 is able to include a hard drive, CDROM, CDRW, DVD, DVDRW, Blu-ray®, flash memory card or any other storage device. The computing device 300 is able to include one or more network interfaces 302. An example of a network interface includes a network card connected to an Ethernet or other type of LAN. The I/O device(s) 308 are able to include one or more of the following: keyboard, mouse, monitor, screen, printer, modem, touchscreen, button interface and other devices. Information retrieval application(s) 330 used to perform the information retrieval method are likely to be stored in the storage device 312 and memory 304 and processed as applications are typically processed. More or less components shown in FIG. 3 are able to be included in the computing device 300. In some embodiments, information retrieval hardware 320 is included. Although the computing device 300 in FIG. 3 includes applications 330 and hardware 320 for the information retrieval method, the information retrieval method is able to be implemented on a computing device in hardware, firmware, software or any combination thereof. For example, in some embodiments, the information retrieval applications 330 are programmed in a memory and executed using a processor. In another example, in some embodiments, the information retrieval hardware 320 is programmed hardware logic including gates specifically designed to implement the information retrieval method.

In some embodiments, the information retrieval application(s) 330 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, Blu-ray® writer/player), a television, a home entertainment system or any other suitable computing device.

To utilize the information retrieval method, a device or several devices are used to perform MARK on a data set. MARK is able to be performed automatically. Using the results of MARK, a user is able to search for and retrieve information.

In operation, the MARK algorithm described herein has the following benefits:

Ranking-oriented: The relative comparison formulation directly targets on ranking problem, making the approach optimal for information retrieval.

Manifold-aware: The algorithm is able to exploit information from ample unlabeled data, which helps to improve generalization performance, especially when there are limited number of labeled constraints.

Nonlinear: As a kernel-based approach the algorithm is able to lead to a highly non-linear metric which is able to model complicated data distribution.

Some Embodiments of Manifold-Aware Ranking Kernel for Information Retrieval

1. A method of manifold-aware ranking kernel learning programmed in a memory of a device comprising:
   a. performing combined supervised kernel learning and unsupervised manifold kernel learning; and
   b. generating a non-linear kernel model.
2. The method of clause 1 wherein Bregman projection is utilized when performing the supervised kernel learning.
3. The method of clause 1 wherein unlabeled data is utilized in the unsupervised manifold kernel learning.
4. The method of clause 1 wherein the result comprises a non-linear metric defined by a kernel model.
5. The method of clause 1 wherein the supervised kernel learning employs a relative comparison constraint.
6. The method of clause 1 wherein the device is selected from the group consisting of a personal computer, a laptop computer, a computer workstation, a server, a mainframe computer, a handheld computer, a personal digital assistant, a cellular/mobile telephone, a smart phone, a smart appliance, a gaming console, a digital camera, a digital camcorder, a camera phone, an portable music player, a tablet computer, a video player, a DVD writer/player, a high definition video writer/player, a television and a home entertainment system.
7. A method of information retrieval programmed in a memory of a device comprising:
   a. receiving a search query input;
   b. performing a search based on the search query input and using a metric kernel learned by manifold-aware ranking kernel learning; and
   c. presenting a search result of the search.
8. The method of clause 7 wherein manifold-aware ranking kernel learning comprises:
   i. performing combined supervised kernel learning and unsupervised manifold kernel learning; and
   ii. generating a non-linear kernel model.
9. The method of clause 8 wherein Bregman projection is utilized when performing the supervised kernel learning.
10. The method of clause 8 wherein unlabeled data is utilized in the unsupervised manifold kernel learning.
11. The method of clause 8 wherein the result comprises a non-linear metric defined by a kernel model.
12. The method of clause 8 wherein the supervised kernel learning employs a relative comparison constraint.
13. The method of clause 7 wherein the search result comprises a set of entities from a database that are similar to the search query input.
14. The method of clause 7 wherein the device is selected from the group consisting of a personal computer, a laptop computer, a computer workstation, a server, a mainframe computer, a handheld computer, a personal digital assistant, a cellular/mobile telephone, a smart phone, a smart appliance, a gaming console, a digital camera, a digital camcorder, a camera phone, an portable music player, a tablet computer, a video player, a DVD writer/player, a high definition video writer/player, a television and a home entertainment system.
15. An apparatus comprising:
   a. a non-transitory memory for storing an application, the application for:
      i. performing combined supervised kernel learning and unsupervised manifold kernel learning; and
      ii. generating a non-linear kernel model; and
   b. a processing component coupled to the memory, the processing component configured for processing the application.
16. The apparatus of clause 15 wherein Bregman projection is utilized when performing the supervised kernel learning.
17. The apparatus of clause 15 wherein unlabeled data is utilized in the unsupervised manifold kernel learning.
18. The apparatus of clause 15 wherein the result comprises a non-linear metric defined by a kernel model.
19. The apparatus of clause 15 wherein the supervised kernel learning employs a relative comparison constraint.
20. An apparatus comprising:
   a. a non-transitory memory for storing an application, the application for:
      i. receiving a search query input;
      ii. performing a search based on the search query input and using a metric kernel learned by manifold-aware ranking kernel learning; and
      iii. presenting a search result of the search; and
   b. a processing component coupled to the memory, the processing component configured for processing the application.
21. The apparatus of clause 20 wherein manifold-aware ranking kernel learning comprises:
   i. performing combined supervised kernel learning and unsupervised manifold kernel learning; and
   ii. generating a non-linear kernel model.
22. The apparatus of clause 21 wherein Bregman projection is utilized when performing the supervised kernel learning.
23. The apparatus of clause 21 wherein unlabeled data is utilized in the unsupervised manifold kernel learning.
24. The apparatus of clause 21 wherein the result comprises a non-linear metric defined by a kernel model.
25. The apparatus of clause 21 wherein the supervised kernel learning employs a relative comparison constraint.
26. The apparatus of clause 20 wherein the search result comprises a set of entities from a database that are similar to the search query input.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of manifold-aware ranking kernel learning programmed in a memory of a device comprising:
receiving a search query input;
performing a search based on the search query input and using a metric kernel learned by manifold-aware ranking kernel learning comprising:
performing combined supervised kernel learning and unsupervised manifold kernel learning, wherein variable-length rank-list constraints are used including a query and feedback, wherein the query and the user feedback belong to a training data set, further wherein supervised kernel learning utilizes a convex optimization including slack variables and margins, wherein the unsupervised manifold kernel learning utilizes an unsupervised manifold kernel which comprises an amplified commute time kernel which is induced from an amplified commute time distance; and
generating a non-linear kernel model; and
presenting a search result of the search.

2. The method of claim 1 wherein Bregman projection is utilized when performing the supervised kernel learning.

3. The method of claim 1 wherein unlabeled data is utilized in the unsupervised manifold kernel learning.

4. The method of claim 1 wherein the result comprises a non-linear metric defined by a kernel model.

5. The method of claim 1 wherein the supervised kernel learning employs a relative comparison constraint.

6. The method of claim 1 wherein the device is selected from the group consisting of a personal computer, a laptop computer, a computer workstation, a server, a mainframe computer, a handheld computer, a personal digital assistant, a cellular/mobile telephone, a smart phone, a smart appliance, a gaming console, a digital camera, a digital camcorder, a camera phone, an portable music player, a tablet computer, a video player, a DVD writer/player, a high definition video writer/player, a television and a home entertainment system.

7. A method of information retrieval programmed in a memory of a device comprising:
receiving a search query input;
performing a search based on the search query input and using a metric kernel learned by manifold-aware ranking kernel learning, wherein variable-length rank-list constraints are used, wherein manifold-aware ranking kernel learning comprises:
performing combined supervised kernel learning and unsupervised manifold kernel learning; and
generating a non-linear kernel model, wherein the unsupervised manifold kernel learning utilizes an unsupervised manifold kernel which comprises an amplified commute time kernel which is induced from an amplified commute time distance; and
presenting a search result of the search.

8. The method of claim 7 wherein Bregman projection is utilized when performing the supervised kernel learning.

9. The method of claim 7 wherein unlabeled data is utilized in the unsupervised manifold kernel learning.

10. The method of claim 7 wherein the result comprises a non-linear metric defined by a kernel model.

11. The method of claim 7 wherein the supervised kernel learning employs a relative comparison constraint.

12. The method of claim 7 wherein the search result comprises a set of entities from a database that are similar to the search query input.

13. The method of claim 7 wherein the device is selected from the group consisting of a personal computer, a laptop computer, a computer workstation, a server, a mainframe computer, a handheld computer, a personal digital assistant, a cellular/mobile telephone, a smart phone, a smart appliance, a gaming console, a digital camera, a digital camcorder, a camera phone, an portable music player, a tablet computer, a video player, a DVD writer/player, a high definition video writer/player, a television and a home entertainment system.

14. An apparatus comprising:
a non-transitory memory for storing an application, the application for:
receiving a search query input;
performing a search based on the search query input and using a metric kernel learned by manifold-aware ranking kernel learning comprising:
performing combined supervised kernel learning and unsupervised manifold kernel learning, wherein variable-length rank-list constraints are used including a query and user feedback, wherein the query and the user feedback belong to a training data set, wherein the unsupervised manifold kernel learning utilizes an unsupervised manifold kernel which comprises an amplified commute time kernel which is induced from an amplified commute time distance; and
generating a non-linear kernel model; and
presenting a search result of the search; and
a processing component coupled to the memory, the processing component configured for processing the application.

15. The apparatus of claim 14 wherein Bregman projection is utilized when performing the supervised kernel learning.

16. The apparatus of claim 14 wherein unlabeled data is utilized in the unsupervised manifold kernel learning.

17. The apparatus of claim 14 wherein the result comprises a non-linear metric defined by a kernel model.

18. The apparatus of claim 14 wherein the supervised kernel learning employs a relative comparison constraint.

19. An apparatus comprising:
a non-transitory memory for storing an application, the application for:
receiving a search query input;
performing a search based on the search query input and using a metric kernel learned by manifold-aware ranking kernel learning, wherein variable-length rank-list constraints are used, wherein manifold-aware ranking kernel learning comprises:
performing combined supervised kernel learning and unsupervised manifold kernel learning; and
generating a non-linear kernel model, wherein the unsupervised manifold kernel learning utilizes an unsupervised manifold kernel which comprises an amplified commute time kernel which is induced from an amplified commute time distance; and
presenting a search result of the search; and
a processing component coupled to the memory, the processing component configured for processing the application.

20. The apparatus of claim 19 wherein Bregman projection is utilized when performing the supervised kernel learning.

21. The apparatus of claim 20 wherein unlabeled data is utilized in the unsupervised manifold kernel learning.

22. The apparatus of claim 20 wherein the result comprises a non-linear metric defined by a kernel model.

23. The apparatus of claim 20 wherein the supervised kernel learning employs a relative comparison constraint.

24. The apparatus of claim 19 wherein the search result comprises a set of entities from a database that are similar to the search query input.

* * * * *

UNITED STATES PATENT AND TRADEMARK OFFICE
CERTIFICATE OF CORRECTION

PATENT NO. : 10,198,695 B2
APPLICATION NO. : 14/213220
DATED : February 5, 2019
INVENTOR(S) : Xun Xu et al.

Page 1 of 1

It is certified that error appears in the above-identified patent and that said Letters Patent is hereby corrected as shown below:

In the Specification

In Column 5, Line 17, please replace "$D_\varphi$" with -- $D_\phi$ --.

In Column 5, Lines 17-18, please replace "$D_\varphi(K_1, K_2) = \varphi(K_1) - \varphi(K_2) - tr(\nabla\varphi K_2)^T(K_1 - K_2))$" with -- $D_\varphi(K_1, K_2) = \phi(K_1) - \phi(K_2) - tr(\nabla\phi K_2)^T(K_1 - K_2))$ --.

In Column 5, Line 19, please replace "e.g., $\varphi(K)$" with -- e.g., $\phi(K)$ --.

In Column 5, Lines 19-20, please replace "$D\ \varphi(K_1,K_2) = tr(K_1\ K_2)\text{-log det}(K_1\ K_2^1)\text{-N}$" with -- $D_\varphi(K_1,K_2) = tr(K_1\ K_2)\text{-logdet}(K_1\ K_2^{-1})\text{-N}$ --.

In Column 6, Line 16, please replace "used for $\varphi$ and $\varphi$" with -- used for $\phi$ and $\varphi$ --.

In Column 6, Line 30, please replace "$K_{t+1} = (K_{t-1} - \alpha_j A_j)^{-1}$" with -- $K_{t+1} = (K_t^{-1} - \alpha_j A_j)^{-1}$ --.

Signed and Sealed this
Tenth Day of December, 2019

Andrei Iancu
*Director of the United States Patent and Trademark Office*